March 10, 1942.     C. E. RUTLEDGE     2,275,683
FABRIC CLIP
Filed Dec. 7, 1940

Inventor
Charles E. Rutledge
By
Reynolds & Beach
Attorneys

Patented Mar. 10, 1942

2,275,683

UNITED STATES PATENT OFFICE 2,275,683

FABRIC CLIP

Charles E. Rutledge, Seattle, Wash., assignor to Boeing Aircraft Company, Seattle, Wash., a corporation of Washington Application December 7, 1940, Serial No. 369,044

6 Claims. (Cl. 24—87)

In the interior finishing of airplanes, in particular, a great deal of fabric is employed. This is attached directly to metal structures or special supports, chiefly of sheet metal, in various ways. Most conveniently it is attached by means of separate clips, and the present invention deals with such clips especially designed and coordinated with the support to hold such fabric, or covers generally, in place upon suitably arranged supports.

Similar principles will apply in other installations, and whether the fabric is actual woven fabric or other material similar in its general nature, and regardless of whether it is the surface fabric or an inner fabric, later covered over, and also regardless of whether several such layers or plies of fabric are included within and held by a single clip. The same principles might be employed in securing fabric covering to the structural members of an airfoil part, for instance an aileron or other control surface.

One of the objects of the invention is to provide a clip of the nature indicated which may be made cheaply and in large quantities, for a great number of such clips are used, particularly in holding the interior finish, upon large present-day commercial airplanes.

It is also an object to provide such a clip which may be quickly and easily applied without particular attention or skill on the part of the workmen.

It is also an object to provide such a clip and a supporting structure coordinated therewith, which will effect the purpose of stretching the fabric to smooth tightness over the surface, and which will, in use, be but slightly noticeable or not at all.

Further objects, and particularly such as relate to the particular structure of the clip itself, will be ascertained hereinafter.

In the accompanying drawing I have shown such a clip embodied in two variant forms, each incorporating the principles of this invention, and have illustrated likewise the assembly as a part of which such a clip is employed.

Figure 1:
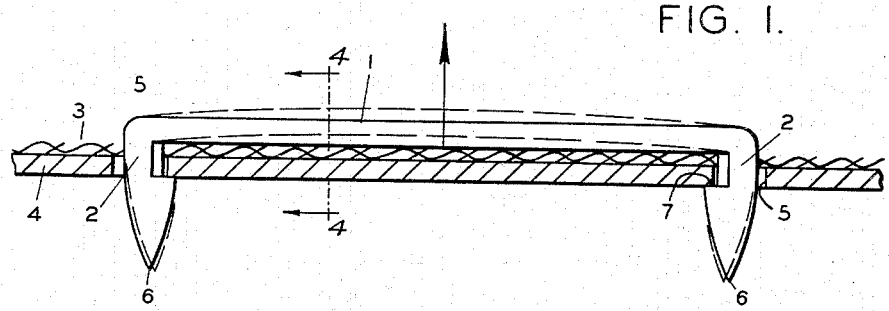
Figure 1 is an elevation of the clip in place, the sheet metal support and fabric being shown in section.
Figures 4, 5:
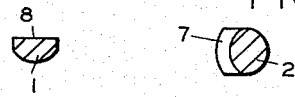

Figures 4 and 5 are sections through the clip, on the respective lines 4—4 and 5—5 of Figure 1.

Figure 6:
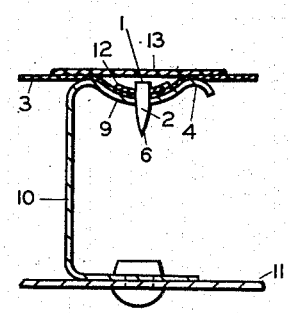

Figure 6 is a cross section through the support and the fabric showing the manner in which the clip cooperates therewith and holds the fabric to the support.

The clip is simple in form, which thereby contributes to simplicity of construction and use. In essence it comprises a bar 1, formed at its two ends with shanks 2 extending generally rectangularly to and in the same direction from the connecting bar 1, and preferably formed as one piece with the bar. For piercing the fabric 3 which they are to hold upon a sheet metal support 4, and for locating the holes 5 in the sheet metal supports, which are disposed in pairs spaced apart a spacing to suit the distance apart of the two shanks 2, these shanks are pointed, as indicated at 6. These shanks also are barbed, as is indicated at 7, and in one form, that shown in Figures 1 and 2, the barbs face inwardly. In the form shown in Figure 3 the barb is formed by directing the tip 7' angularly and preferably outwardly or away from the barb 7 which is formed on the opposite shank, but in either instance the effect is the same.

The barb should be spaced from the connecting bar 1 by a distance which is only substantially equal to the thickness of the sheet metal support 4 and of the fabric 3 which is to be held thereto. In consequence the shanks, within the barbs, are quite short, and in addition they are of such cross section, seen in Figure 5, that they are comparatively stiff and unyielding. However, the clip as a whole is preferably made of material which is yieldable and resilient, and particularly is the connecting bar 1 resilient, at least for upward bending at its ends. To improve its resilience in this respect, and to facilitate upward bending of the ends, the bar 1 is preferably formed rather flat on its top, as is indicated at 8 in Figure 4.

The support 4, of sheet metal, may be formed in any manner, but the clip is designed for use with a particular thickness of sheet metal and fabric, and for a given spacing apart of the holes 5. Preferably, however, the support 4 is channeled, as indicated at 9 in Figure 6, and it may be formed as a flange upon a sheet metal stiffener or contour member, generally indicated at 10, and adapted to be secured upon a structural element 11. The holes 5 are formed in the bottom of the channel 9.

Figure 2:
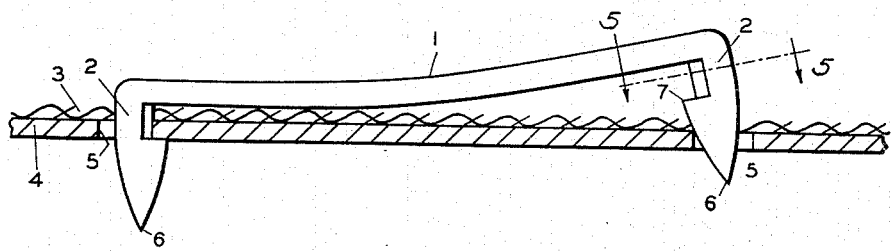
Figure 2 is a view similar to Figure 1, showing the manner of engaging the clip with the fabric and the support.
Figure 3:
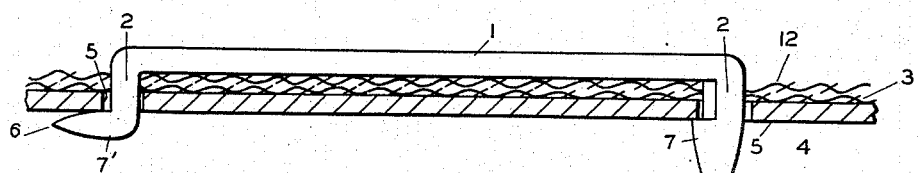
Figure 3 is a view similar to Figure 1, showing a modified form of clip.

The fabric 3 which is to be secured in place is laid over the support 4. The clips are engaged, to draw the fabric taut, the points 6 pressing through the fabric 3, and through any reinforcing patch 12 or additional layer of fabric, such as indicated in Figures 3 and 6, until one of the points, for instance that shown at the left in Figures 1, 2, and 3, passes through one of the holes 5, which preferably is only of a size to pass comfortably the barb 7 or 7' at this end. The opposite point 6 is now pressed inwardly, but since the shanks 2 are spaced almost identically equal to the spacing of the closest edges of the holes 5 of a given pair, and since the barb 7 must underlie the sheet metal 4 at the inner edge of the second hole, there must be some yielding to pass the second point through its hole. The resilience of the connecting bar 1 permits this, and it is to be noted particularly that the shanks are so short and stiff that there is no appreciable flexibility in these shanks themselves. The flexibility is rather in the long connecting bar, which is not only of resilient material, but which is flattened and particularly arranged so that it will flex upwardly at the opposite end, as is shown in Figure 2.

The engagement of the first barb locates the second point with relation to its hole, and the yielding of the connecting bar 1 permits the clip to yield so that the barb 7 at the right-hand end will pass through its hole, and then, with the stress which deformed the bar 1 relieved, the bar's resilience snaps the barb back inwardly, and under the under side of the sheet metal support 4, where the clip is now locked in place. The result is the same whichever form of barb is employed, either that shown in Figure 1 or that shown in Figure 3. Always one of the barbs faces inwardly, that is, towards the opposite end of the bar, and if there is only one such barb, as in the form of Figure 3, it is that barb which is last engaged.

By reason of the fact that the holes are in the bottom of the channel 9, if the support is located intermediate two stretched edges of the sheet of fabric, the engagement of the clips in this manner further stretches the fabric and draws it downwardly into the channel 9, and in addition this channel forms a space within which the overlying bar 1 may lie, and the smooth surface of the fabric may be restored by a cover strip or tape 13 which is cemented in place over the channel.

I have used the term "inwardly" primarily to mean in a direction toward another element. I have used the term "downwardly" to indicate the bottom of the sheet or the underside or distant face of the support, but if the attachment is being made overhead, as in a ceiling, these indications of direction would, of course, refer to what is then uppermost or upwardly.

It will be noted, in Figure 1, how a pull upon the fabric will tend to tighten the securement to the support, rather than to loosen it. For instance, if the fabric is pulled, to produce a force indicated by the arrow A, acting upon the clip, there is no tendency to bend the clip upwardly at an end, regardless of where the force is applied. The barbs 7 or 7' offer the most secure anchorage. Instead, such force can have no effect other than a tendency to bow the bar 1 upwardly between its ends, as is shown exaggeratedly in dash lines, which in turn tends to draw the barbs even more closely together.

It is not intended that the clips be removable to take down the fabric. Such fabric is seldom removed except when major repairs or changes are to be made, or when complete interior redecoration is required, hence whenever it is removed it is unlikely to be replaced, and is merely ripped out, leaving the clips in place, for later removal if desired. Clips of this design, therefore, are formed for quick and permanent engagement.

What I claim as my invention is:

1. A clip for securing fabric upon an underlying sheet metal support formed with a pair of widely spaced holes, against a pull outwardly of the support, said clip comprising a pair of stiff shanks, similarly spaced, inwardly facing barbs formed upon said shanks, said shanks being of a length, inside the barbs, only substantially equal to the combined thickness of the sheet metal and of the fabric, the barbs being spaced apart less than the spacing between the holes, and a long resilient connecting bar of a length corresponding to the spacing of the holes, said bar by its resilience yielding to pass the barbs through the holes, but snapping them back, when passed through the holes, into engagement beneath the under side of the sheet metal support.

2. A clip for securing fabric upon an underlying sheet metal support which is formed with a pair of widely spaced holes, comprising a pair of relatively stiff shanks similarly spaced, and formed with barbs engageable beneath the under side of the sheet metal support, at least one of said barbs facing inwardly, said shanks, inside the barbs, being of a length only substantially equal to the combined thickness of the sheet metal and the fabric to be secured, and a relatively long straight resilient connecting bar of a length corresponding to the spacing of the holes, and by its resilience yielding to pass the inwardly-facing barb, after engagement of the other, through the hole, but snapping it inwardly, after it has passed through the hole, into engagement beneath the under side of the sheet metal support, said bar thereupon and thereby being held flat against the fabric.

3. A clip for securing fabric upon an underlying sheet metal support which is formed with a pair of widely spaced holes, against a pull away from the support, said clip comprising a pair of stiff shanks, similarly spaced, inwardly facing barbs formed upon said shanks, said shanks being of a length, inside the barbs, only substantially equal to the combined thickness of the sheet metal and of the fabric, the barbs being spaced apart less than the spacing between the holes, and a long resilient integral connecting bar of a length corresponding to the spacing of the holes, said bar being generally flat on its top and rounded on its bottom, to facilitate its bending upwardly at either end to pass the respective barbs through the fabric and the holes in the support, and by its resilience snapping the barbs inwardly beneath the under side of the sheet metal after passing through the holes, thereby to lock the clip in place, and the fabric to the support.

4. A clip for securing fabric upon and resisting a pull away from an underlying sheet metal support formed with a pair of widely spaced holes, comprising a resilient bar of a length corresponding to the spacing of the holes, a shank projecting downwardly from each end of the bar, and formed with a point to pierce the fabric and to guide its shank into its hole, one such shank having an outwardly facing tip spaced from the bar by an amount only substantially equal to the thickness of the sheet metal and of the fabric, whereby it may initially pierce the fabric and a hole, and be engaged beneath the under side of the sheet metal, and the opposite shank being formed with an inwardly facing barb, similarly spaced from the bar, and spaced from the opposite shank by less than the spacing of the holes, said shank being engageable beneath the under side of the sheet metal, after piercing the fabric and its own hole, principally by reason of the resilience of the bar, yielding to permit passage of the barbed point through the hole, and snapping it inwardly beneath the inner edge of the hole.

5. In combination with a sheet metal support formed with a flange, and having holes arranged along the flange in pairs, the holes of each pair being spaced a given distance apart, a cover sheet overlying the flange, and clips for securing said sheet to and resisting a pull away from the support, comprising a bar formed to lie flat against the support and the cover, when in operative position, and parallel shanks at the opposite ends thereof, spaced apart by a distance substantially equal to the spacing between the holes of a pair, a barb upon each shank, the spacing between the barb on one shank and the opposite shank being less than the spacing between the holes, and each shank, inside the barbs, being of a length substantially equal to the thickness of the flange and of the cover, the bar being resilient in the plane common to itself and the shanks, whereby the barbs may be snapped into place beneath the under side of the flange, after their engagement in their respective holes through the cover, to hold the bar in close contact with the upper side of the cover and the flange.

6. A clip for securing fabric upon an underlying support, of relatively thin section, which is formed with a pair of widely spaced holes extending through the support, said clip comprising a resilient bar of a length corresponding to the spacing of such holes, and formed to lie flat against the support and the overlying fabric, a stiff shank projecting at each end of the bar to enter the respective holes, and formed with barbs engageable beneath the under side of the support, said shanks, inside of the barbs, being of a length only substantially equal to the combined thickness of the sheet metal and the fabric to be secured, at least one of the barbs facing inwardly towards the opposite shank, and being spaced therefrom less than the distance between holes, the bar by its resilience yielding to pass the inwardly-facing barb, after engagement of the other, through the hole, but snapping it inwardly after it has passed through the hole, into engagement beneath the under side of the support, the bar being thereby and thereupon held closely against the fabric.

CHARLES E. RUTLEDGE.